(12) United States Patent
Goorden

(10) Patent No.: US 6,485,613 B1
(45) Date of Patent: Nov. 26, 2002

(54) BATCH-CONTINUOUS COUNTERCURRENT MASS TRANSFER PROCESS

(75) Inventor: Josephus Johannes Petrus Maria Goorden, Roosendaal (NL)

(73) Assignee: Continental Engineering B.V., Amsterdam (NL)

( * ) Notice: Subject to any disclaimer, the term of this patent is extended or adjusted under 35 U.S.C. 154(b) by 0 days.

(21) Appl. No.: 09/530,692

(22) PCT Filed: Nov. 4, 1998

(86) PCT No.: PCT/NL98/00636

§ 371 (c)(1),
(2), (4) Date: May 4, 2000

(87) PCT Pub. No.: WO99/22837

PCT Pub. Date: May 14, 1999

(30) Foreign Application Priority Data

Nov. 4, 1997 (NL) .............................................. 1007442

(51) Int. Cl.[7] .......................... B01D 3/14; B01D 11/02; B01D 11/04; B01D 47/12
(52) U.S. Cl. ................. 203/100; 202/158; 203/DIG. 11; 203/DIG. 16; 210/295; 210/634; 261/128; 261/114.2; 261/114.4; 261/114.5; 261/5; 261/114.1; 585/800
(58) Field of Search .......................... 203/100, DIG. 11, 203/DIG. 16; 202/158, 200; 261/113, 5, 114.1–114.5, 114.2, 114.4, 128; 210/295, 634; 585/800

(56) References Cited

U.S. PATENT DOCUMENTS

| | | | |
|---|---|---|---|
| 2,009,347 A | 7/1935 | Sheldon | |
| 2,628,894 A | 2/1953 | Langmyhr | |
| 2,759,801 A | 8/1956 | Yeager et al. | |
| 2,840,459 A | 6/1958 | Karnofsky | |
| 3,788,954 A | * 1/1974 | Cantrell | 203/89 |
| 5,352,837 A | * 10/1994 | Hsu et al. | 568/41 |
| 5,421,972 A | * 6/1995 | Hickey et al. | 204/186 |
| 6,001,220 A | * 12/1999 | Hillstrom et al. | 202/153 |
| 6,101,841 A | * 8/2000 | Billingham et al. | 62/643 |

FOREIGN PATENT DOCUMENTS

| | | |
|---|---|---|
| FR | 862750 | 3/1941 |
| FR | 2401685 | 3/1979 |
| NL | 105668 | 3/1963 |
| NL | 105669 | 3/1963 |
| WO | WO 9505091 | 2/1995 |

* cited by examiner

*Primary Examiner*—Virginia Manoharan
(74) *Attorney, Agent, or Firm*—Young & Thompson

(57) ABSTRACT

Mass transfer process, in which, in at least two contact stages, and at least two liquid or gaseous phases are brought into contact with one another, at least one component being transferred between the phases and the phases moving countercurrently. The flow through at least one of the contact stages is batchwise for one phase and continuous for another phase. The phases flow through contact stages which are formed by trays in a column, which trays are opened periodically so that the phase which flows through the column in a batchwise manner flows to the next tray.

31 Claims, 15 Drawing Sheets

BATCH-CONTINUOUS COUNTERCURRENT MASS TRANSFER PROCESS

The present invention relates to a mass transfer process in which, in two or more contact stages, two or more liquid or gaseous phases are brought into contact with one another, one or more components being transferred between the phases and the phases moving countercurrently with respect to the overall configuration.

Mass transfer processes have already been in use for many years and in recent decades have undergone systematic consideration. In the present application, mass transfer processes are understood to mean processes in which at least one component is transferred from one phase to another phase. It relates to processes such as distillation, extraction and washing.

Depending on the manner of contact between the phases, mass transfer processes can be divided into the following classes:

Steady-state and non-steady-state processes. Steady-state processes are those processes in which the conditions, such as concentration at any location in the system, the volume of the different flows and the compositions of the different flows, are constant over time.

With regard to direction of flow of the phases through the process with respect to one another. In this way, processes are divided into concurrent, counter-current and crosscurrent.

The way in which the phases flow through the stages in which the contact between the phases takes place. In this context, the following distinction is made: continuous/continuous: both phases flow through the contact stages continuously; batch/batch: both phases flow through the contact stages in a batchwise manner; and continuous/batch: the flow through the contact stages is continuous for one phase and batchwise for the other phase.

In order to achieve efficient, large-scale mass transfer operations, the professional process engineering world nowadays primarily selects processes in which the conditions are steady-state;
the phases move countercurrently in order to obtain the maximum number of equilibrium stages and thus the maximum level of mass transfer
both phases flow continuously through the contact stages.

These processes can therefore be referred to as steady-state, continuous/continuous countercurrent processes.

The general reasons cited by the professional process engineering world for selecting the steady-state design rather than the non-steady-state batch/batch design for liquid or gaseous phases when efficient mass transfer is desired are as follows:

Steady-state countercurrent processes make it possible, in equipment of identical size, to obtain a better separation of components than that which is achieved in non-steady-state process types.

To achieve the same separation level, choosing a steady-state counter-current process allows the equipment to be smaller than if a non-steady-state process type were to be selected.

In addition, processes with continuous/continuous flow are preferably selected owing to the fact that temporary storage is required for batch/batch processes.

These arguments in favour of selecting steady-state countercurrent processes are based on the fact that there is no knowledge, in the above-mentioned phase sector, of using non-steady-state countercurrent mass transfer processes with a plurality of stages. For this reason, comparisons are generally made between a single-stage non-steady-state process and a multistage steady-state countercurrent process. The result is what one might call an unfair comparison. This fact will be referred back to later.

An example of a steady-state continuous/continuous countercurrent distillation process is described in Dutch Patents 105668 and 105668. Although the descriptions of the processes given in these documents refer to a stepwise method, the phases are fed to and discharged from the contact stages continuously; both the liquid and the gaseous phases flow continuously through the contact stages.

An example of a steady-state continuous/continuous extraction process is described in U.S. Pat. No. 2,009,347. The device which is described in this document is designed in such a manner that each stage of the device comprises both a mixing zone and a separation zone. As soon as this process is fully operational, the feed and discharge of the heavy and light phases to and from each stage take place continuously.

An intermediate form between batch/batch processes and continuous/continuous processes is formed by the batch/continuous processes. In these processes, one of the phases flows through the contact stages in a batchwise manner and another phase flows through the contact stages continuously. These processes too can be of countercurrent design with more than one stage.

Since it is considered that steady-state continuous/continuous processes are the most efficient processes, non-steady-state, batch/continuous countercurrent processes with more than one stage have hitherto been designed only for solid/liquid extractions. The reason for this is that in processes of this nature there are practical drawbacks in carrying out a continuous/continuous steady-state process.

Thus far there is no knowledge of carrying out non-steady-state mass transfer processes between gaseous and liquid phases countercurrently, with the result that it has not been recognised that with a design of this nature the performance of the process is improved enormously if the phase with most back mixing flows in a batchwise manner.

It has now been found that it is also possible to carry out mass transfer processes in which the phases are liquid or gaseous under non-steady-state, countercurrent conditions. Therefore, the present invention provides a mass transfer process in which, in two or more contact stages, two or more liquid or gaseous phases are brought into contact with one another, one or more components being transferred between the phases and the phases moving countercurrently with respect to the overall configuration of the process, characterized in that the flow through one or more of the contact stages is batchwise for one phase and continuous for another phase.

According to the present invention, it has been found that it is possible to carry out countercurrent mass transfer processes with more than one stage under non-steady-state conditions. For example, if a distillation column is considered, the present invention offers the following advantages:

Owing to the lower strip factor (lower hydraulic load) in a batch/continuous design according to the invention, the diameter of a column can be reduced by up to 50% compared to the design which uses a continuous/continuous countercurrent process.

The power consumption of a batch/continuous process is lower by a factor of from 1.5 to 2 than that of a continuous/continuous design. In a batch/continuous process, the column height can be smaller by a factor of 2 than that of a continuous/continuous design.

Further advantages of the invention will be explained below with reference to specific embodiments.

The following definitions will be used in the present text:

A "steady-state process" is understood to mean a process in which the concentration at any location in the system, the volume of the different flows and the compositions of the different flows are independent of time.

A "non-steady-state process" is understood to mean a process in which the parameters mentioned above are dependent on time.

"Contact stage" is understood to mean that part of a process in which the phases are brought into contact with one another and—after mass transfer has taken place—are separated from one another again.

"Batch(wise)" flow through the contact stage is understood to mean that there is no significant feed or discharge of the relevant phase from and to the contact stage over a certain period of time.

"Continuous" flow through the contact stage is understood to mean that the relevant phase is fed and discharged continuously to and from the contact stage.

In this connection, it should be noted that if, with batch flow to a contact stage, so-called weeping or entrapment, for example, occurs, this flow is still considered to be batchwise.

In the case of continuous flow, the feed and discharge do not always have to be equal.

"Liquid" and "gaseous" phases, according to the invention, are also understood to encompass fluid phases such as those which occur in supercritical extraction. Such fluid phases have properties which are found both in liquid and in gaseous phases.

The present process can be employed, inter alia, in the following fields: distillation, extraction and washing processes, This means distillation, extraction and washing processes in a broad sense.

Distillation processes are to be understood as meaning all forms which occur in practice, such as stripping, absorption and rectification operations and reactive distillation and extractive distillation. In these processes, heat may be supplied or removed in the contact stages by means of external reboilers, coils arranged internally on the trays or other types of heat exchangers. It is also possible to combine the process according to the invention with, for example, packed beds in the distillation device, or alternatively combinations with new distillation techniques are possible. One example of such a new distillation technique is the partitioning of the distillation column in the horizontal direction, allowing parallel flows to be used in the distillation column.

The present invention is suitable in particular for the distillation of mixtures with a narrow boiling range. Such mixtures are known to the person skilled in the art. The following mixtures may be mentioned as examples: ethylene/ethane, propylene/propane, n-butane/i-butane and n-pentane/i-pentane. The invention is also particularly suitable for the cryogenic distillation of air/nitrogen mixtures.

Extraction and washing processes also refer to all such processes which are known in process engineering.

The present invention also includes mass transfer processes in which one of the phases is a liquid and another phase is a liquid which contains a dispersed solid, which phases transfer mass in the contact stage by mixing, and in which, after the mass transfer separation takes place at each contact stage resulting in liquid-containing solid phase and a liquid phase which does not contain any solid material. This process may be both a washing process and an extraction process.

The invention also encompasses couplings, combinations and applications in networks of process steps in which the process according to the invention, owing to its inherent advantage, itself provides an even greater advantage in the integrated process.

The invention is particularly suitable for processes in which the batch phase in the meantime undergoes another treatment. In this case, the batch phase may, if appropriate, be conveyed to a device situated outside the column. The desired treatment then also takes place in this device.

The invention also includes the use of hybrid processes in which the distillation, extraction or washing process in a device is coupled to other unit operations or separation stages, such as combinations with membrane, adsorption or crystallization separation. The use of the invention may also lead to better results in reaction steps in distillation, extraction or washing columns, and these also lie within the scope of the invention.

In the batch/continuous process, the heavy as well as the light phase may move through the contact stage in a batchwise manner. In the case of distillation, the heavy phase is the liquid or slurry, and in the case of extraction the heavy phase is the phase with the highest density.

It is preferable if the flow through two or more, and even more preferably through all, of the contact stages is batchwise for one phase and continuous for another phase.

In particular, the phases flow through contact stages which are formed by trays in a column, which trays are opened periodically so that the phase which flows through the column in a batchwise manner flows to the next tray.

It is also possible for the phases to flow through contact stages which are formed by separate vessels which are coupled in such a manner that, by diverting the phase which passes through the contact stages continuously, the batchwise phase can remain in the same vessel throughout the entire process, while the phases are nevertheless countercurrent. As well as separate vessels, it is also possible to use modified vessels in which separate zones are present.

Each contact stage may be coupled to a stage in which the two phases are separated from one another. This separator may be a gravitation settler, a centrifuge or a filtration device (including also membrane filtrations).

The invention also provides a device for mass transfer comprising a reservoir with a top and a bottom;

a feed in the top and a discharge in the bottom, for feeding and discharging a phase;

a feed in the bottom and a discharge in the top, for feeding and discharging another phase;

two or more contact stages in which one phase is brought into contact with the other phase;

characterized in that the contact stages are designed in such a manner that one phase flows through the contact stage in a batchwise manner and the other phase flows through the contact stage continuously.

The device described, which operates in accordance with this novel batch/continuous design, is superior to devices which are currently known in terms of both investment costs and operating costs, as well as performance.

In addition to the components described above, the device according to the invention may also include all standard components which are usually employed in continuous/continuous processes. Consideration may be given in this context to: additional means for feeding and discharging different flows, heat exchangers, etc.

If it is necessary, for certain applications, to damp pressure fluctuations caused by trays suddenly emptying, baffles or other types of internals may be installed on the tray in the descending liquid flow.

The contact stages in the device may be designed as trays which can rotate along a horizontal axis, in which case, when the tray is lying in the horizontal plane, the tray fits into the column in such a manner that the mass transfer can take place optimally, and, when the tray is rotated out of the horizontal plane, the desired phase can be periodically conveyed to the next tray.

The device may be designed in such a way that the phase which passes in a batchwise manner into successive trays in the column is transported by a device outside the column. If appropriate, it is also possible in this device to carry out a separate treatment of the phase which is passing through the device.

In addition to the phases between which the mass transfer takes place, other phases may also be present in the process. These other phases may be liquid, gaseous or solid. If there is a solid phase, this phase does not contribute to the mass transfer. This is the case, for example, if the phase to be extracted still contains solid particles, for example remainders of microorganisms. In this case, this solid material is dispersed in the phase to be extracted.

The present invention also provides a mass transfer process in which, in two or more contact stages, two or more liquid or gaseous phases are brought into contact with one another, one or more components being transferred between the phases and the phases moving countercurrently with respect to the overall configuration of the process, characterized in that the flow through two or more of the contact stages is batchwise for two phases.

The present invention will now be described in more detail with reference to the figures, in which.

Figure 1:
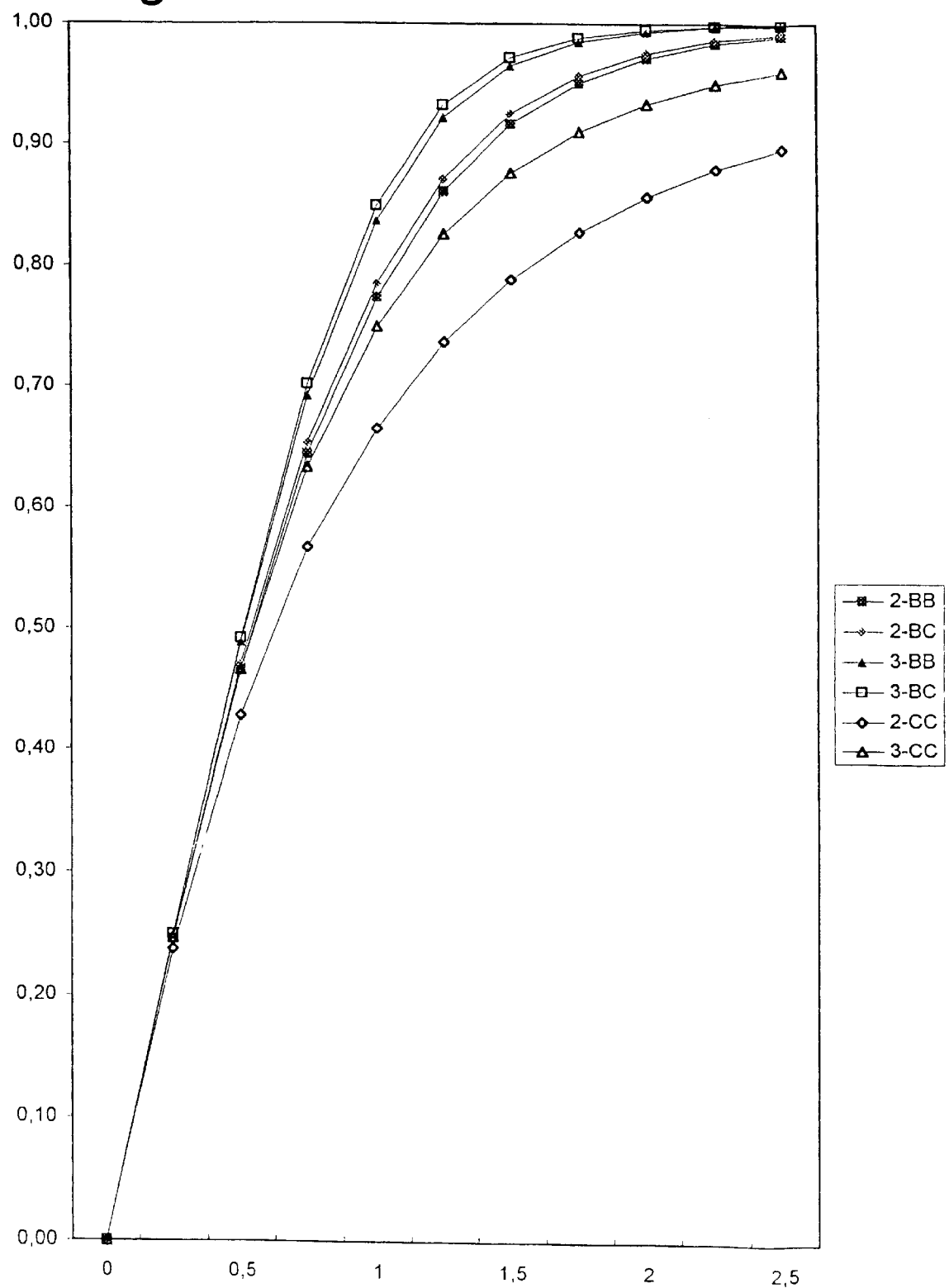
FIG. 1 shows a graph displaying the removal efficiency against the strip factor, with a curve plotted for batch/continuous, continuous/continuous and batch/batch countercurrent processes.

The graph shown in FIG. 1 compares the batch/batch countercurrent process with the batch/continuous countercurrent process and the continuous/continuous countercurrent process. The strip factor is shown on the horizontal axis of the graph.

The strip factor is defined as follows:

$$S = \frac{mG}{L}$$

where S is the strip factor, m is the partition coefficient of the relevant component over the phases, G is the flow rate of the gas phase and L is the flow rate of the liquid phase. This factor is dimensionless. The strip factor is generally used in the distillation world a$ an important underlying variable which potentially determines what level of separation can be achieved in the contact stages. In extraction, the same factor is generally referred to as the extraction factor. In that case, G stands for the flow rate of the extracting phase. In the case of washing, this factor is known as the washing factor and G stands for the flow rate of the washing liquid. Since all these factors have essentially the same meaning for the process, the following applies: strip factor=extraction factor=washing factor.

In the graph, the vertical axis shows values for the removal efficiency (dimensionless fraction on a logarithmic scale), i.e. the fraction not removed component from the liquid phase. The graph shows how the "fraction not removed" depends on the strip factor.

The codes BB, BC and CC respectively indicate batch/batch, batch/continuous and continuous/continuous processes. The number preceding the code indicates the number of contact stages.

Conventional theoretical calculation models were used to calculate the different values in FIG. 1 and also the values in FIGS. 7, 8, 9 and 10, which will be discussed below. For these calculations, the starting point employed was the known values for batch/continuous processes carried out in one stage, converted to several stages. In this connection, the following starting points are used in order to illustrate the difference in separation efficiency between steady-state countercurrent processes (A) and non-steady-state countercurrent processes (B).

A) Steady-state Countercurrent Processes:

Continuous/continuous countercurrent processes with contact stages in which the phases are ideally mixed. The transfer in the contact stages is 100%. These represent models used to describe existing distillation processes using trays, extractions in cascades and countercurrent washing processes. In practice, the efficiency of the contact stages in these processes is normally lower.

B) Non-steady-state countercurrent processes:

Batch/continuous countercurrent processes. One phase flows continuously through the contact stage. The other phase flows in the opposite direction through the contact stages in a batchwise manner. The phases are ideally mixed in the contact stages. The transfer in the contact stages is 100%.

It is clear that the batch/batch countercurrent process exhibits a slightly worse performance than the batch/continuous countercurrent process. However, it is also clear that the batch/batch countercurrent process nevertheless remains superior in terms of performance to the continuous/continuous countercurrent process.

The present invention will now be described in more detail with reference to a number of exemplary embodiments.

1. Distillation. Batch/continuous Design.

Figure 2:
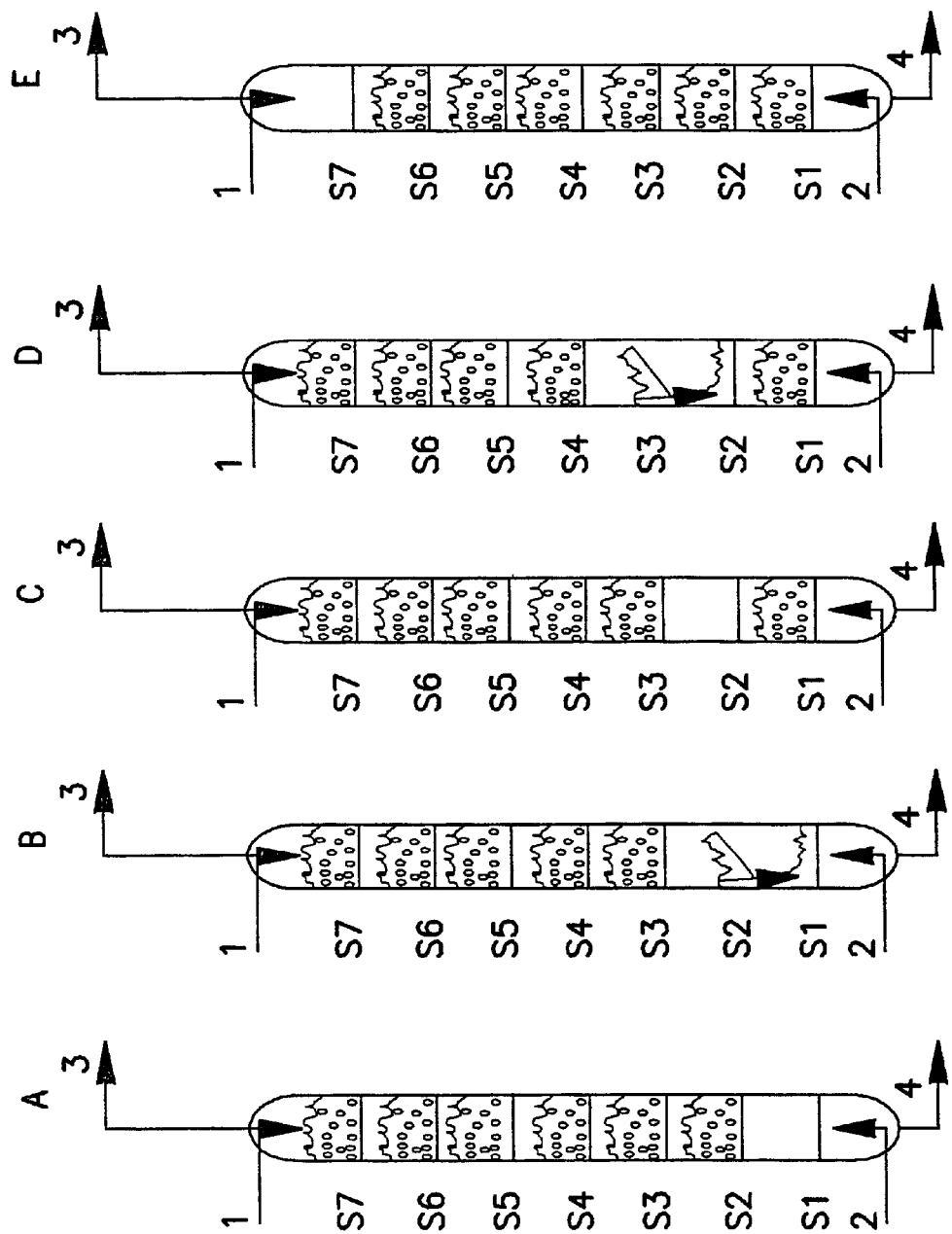
FIG. 2 shows an example of a batch/continuous distillation device according to the invention.

FIG. 2 shows an embodiment of a batch/continuous distillation column with 7 trays. The trays are denoted by S1 to S7. This is designed for a stripper. The strip gas is supplied continuously from below the bottom tray in the column (2) and passes through the trays in a continuous manner and leaves via the top of the column (3). The feed stream is metered onto the top tray in the column in a batchwise manner. This takes place after tray 7 (column situation E) has been emptied and closed. The liquid flows downwards in a batchwise manner from tray to tray and leaves the column via the bottom (4).

It is essential to the design that the batchwise movement of liquid from tray to tray take place without mixing of liquid from the separate trays.

FIG. 2 illustrates how this is achieved in the invention. In the column situation A, tray 1 is empty and the rest of the trays are filled with liquid. The gas bubbles through the holes in the tray and through the liquid. When sufficient components have been transferred between the liquid in tray 2, which is the tray above the empty tray, and the gas phase bubbling through it, the liquid is conveyed from tray 2 into the empty tray 1. This is achieved by forming a sufficiently large opening in the tray 2, through which the liquid can flow quickly downwards. (The liquid in the other trays therefore remains in the trays in question).

The column situation B in FIG. 2 illustrates the opened tray 2 and the emptying of the liquid from tray 2 into tray 1.

Column situation C in FIG. 2 shows the situation in which tray 2 has been emptied and closed again. After tray 2, it is the turn of tray 3 to be emptied. This is illustrated in FIG. 2 in column situation D. The emptying process is repeated for all the trays which lie above tray 3 until the top tray, tray 7 (cf column situation E in FIG. 2), has been emptied. This top tray is filled from an external source and the emptying cycle proceeds with tray 1.

Figure 3A:
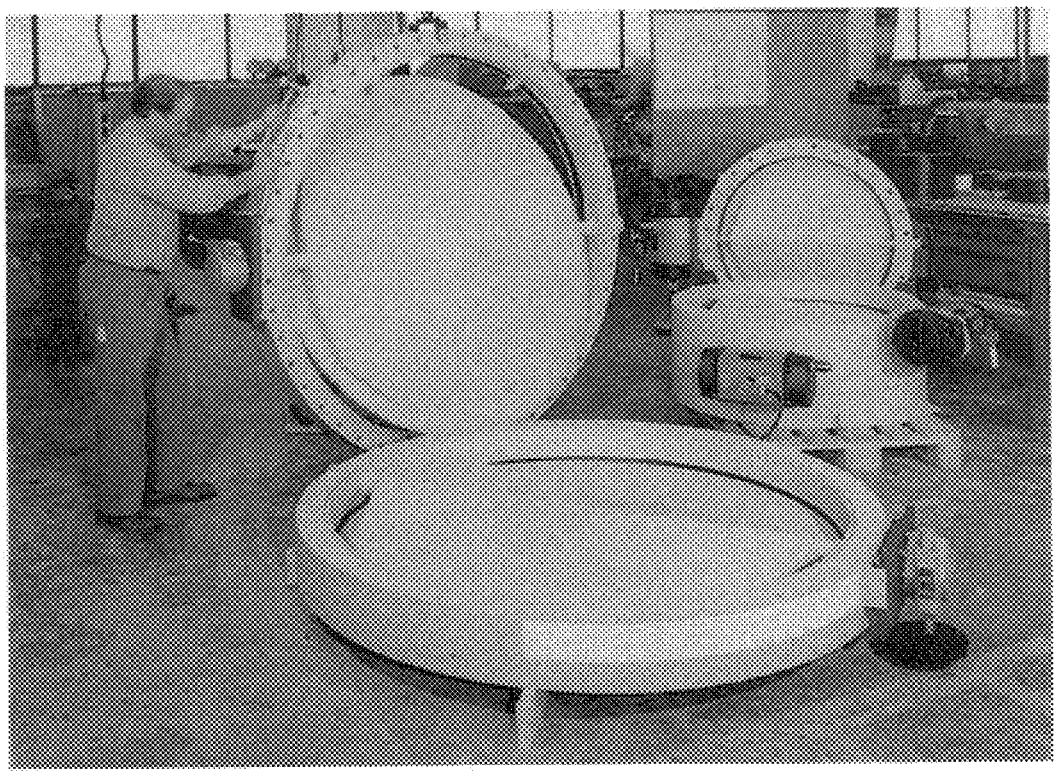
FIGS. 3a–3c show an example of a rotatable tray.
Figure 3B:
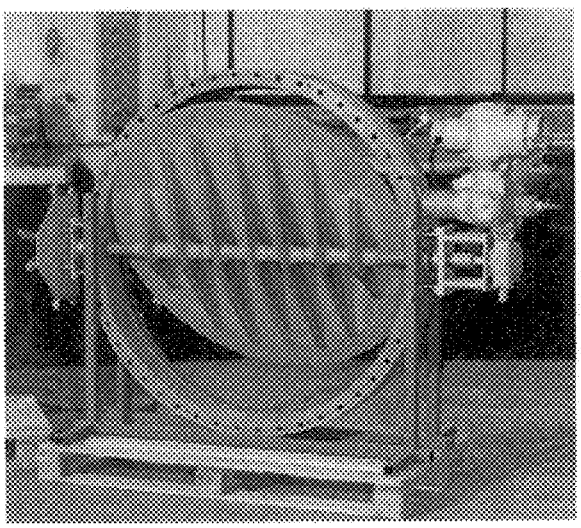
Figure 3C:
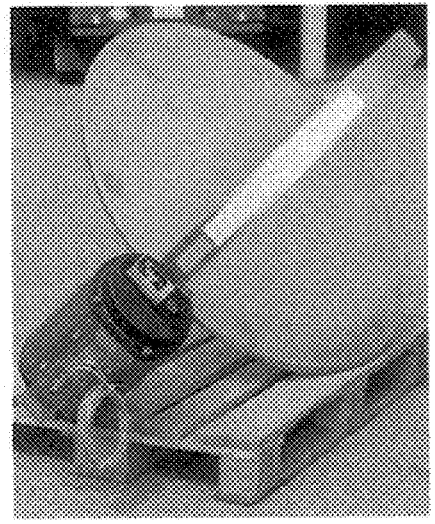

According to one embodiment, it is possible to select a tray which can rotate (about an axis). FIG. 3 shows photographs illustrating a possible design of such a rotatable tray.

Thus, when the liquid filling the tray has been sufficiently enriched or depleted with respect to the components involved in the distillation, the liquid flows into the next tray below as a result of the first tray being rotated open. When this tray is empty, it is rotated back into the original position, with the result that it is virtually impossible for any more liquid to leak downwards. An electric motor or other drive means provides the moment required for the rotational movement. In this example, bubble caps are installed on the rotatable tray in order to minimize weeping. The tray may also be designed with valves for passing the gas, Small holes or slits with little weeping are also possible. Conventional bubble caps and valves may, if appropriate, be modified in order to fulfill the additional requirements imposed on the batch/continuous operation of a device. It is possible, for example, to limit weeping further.

Another embodiment is one in which a plurality of trays are emptied simultaneously in a batchwise manner. This is done if this is required in view of the volume of liquid conveyed in the column and the capacity, In a possible application of the above-described embodiment of a stripper, steam is supplied at the bottom as the continuous strip gas. At the top, water/butanol is supplied as the batchwise feed stream. The performance is as expected in accordance with the data shown in FIG. 7.

Valve trays (which are in widespread use in the distillation world), in which the valves open on command, via an electromagnetic, pneumatic, hydraulic or some other opening principle, sufficiently far for it to be possible to empty the trays quickly in a batchwise manner, represent a further alternative embodiment of the invention.

Trays in which pans of the tray are made rotatable or in which the tray can be opened in some other way before being emptied also form alternative embodiments of the apparatus of the invention.

Magnetic couplings and other seal-free coupling facilities also form attractive alternative apparatus designs in order to achieve leak-free structures.

Furthermore, it is possible to employ movable trays. With the aid of this method, it is possible to empty all the trays into the tray lying below at the same time. A movable tray, which is present between each pair of successive fixed distillation trays, ensures that the separate volumes in the trays (stages) remain suitably separated during the sinmultaneous emptying of the different trays. In this context, the movable tray is referred to below as the floating intermediate tray. The intermediate tray has the characteristic feature of floating on the heaviest phase and sinking into the light phase (if appropriate on the heaviest phase with a gas hold up, as occurs on a distillation tray).

In the emptying phase of the fixed trays, therefore, the floating intermediate tray prevents mixing of the liquid of the phase which is conveyed in a batchwise manner, exiting the different trays. This is possible because this intermediate tray, during emptying, is situated between the liquids (emanating) from the different fixed trays and, during this emptying phase, is impermeable to the liquid which is conveyed in a batchwise manner. During normal execution of the distillation, opened holes in the floating intermediate trays makes them permeable to the liquid. In principle, during distillation for example, the floating intermediate tray floats on the liquid.

The descending heavy phase from the fixed tray which lies above the floating tray provides the force for closing the holes, for the liquid, in the floating plate in short time. The floating plate remains permeable to vapour, gases or a light liquid phase in all cases.

2. Column Extraction in a Batch/continuous Design.

The principle described above may also be used for liquid/liquid extraction in columns. The tray design and the emptying principle are identical to the tray design in FIG. 2, but are configured for a light liquid phase and a heavy liquid phase. The simultaneous emptying of the trays with a floating intermediate tray as described above forms an attractive option for column extraction according to the invention.

In a standard continuous/continuous Scheibel countercurrent column with 16 trays and a maximum tray efficiency of 30%, it is possible, with a strip factor of 1.5, to achieve a result of 0.05 of a fraction not removed of the component(s) which are to be removed. In a batch/continuous countercurrent column configuration, 2 trays are required to achieve the same result.

If fewer than 4 to 5 extraction stages arc required, column extraction is not generally selected; rather, preference is given to less expensive mixer/settler extraction. Therefore, a batch/continuous process makes it possible to dispense with a high and expensive column.

3. Batch/continuous Extraction in a Mixer/centrifuge Arrangement.

This example deals with a 2-step batch/continuous countercurrent extraction of clavulanic acid from an aqueous phase with ethyl acetate as the extraction agent. Clavulanic acid is a component of a viscose fermentation slurry with highly emulsifying properties.

Naturally, these substances serve merely as examples, and this principle may also be employed with other combinations of substances.

Figure 4:
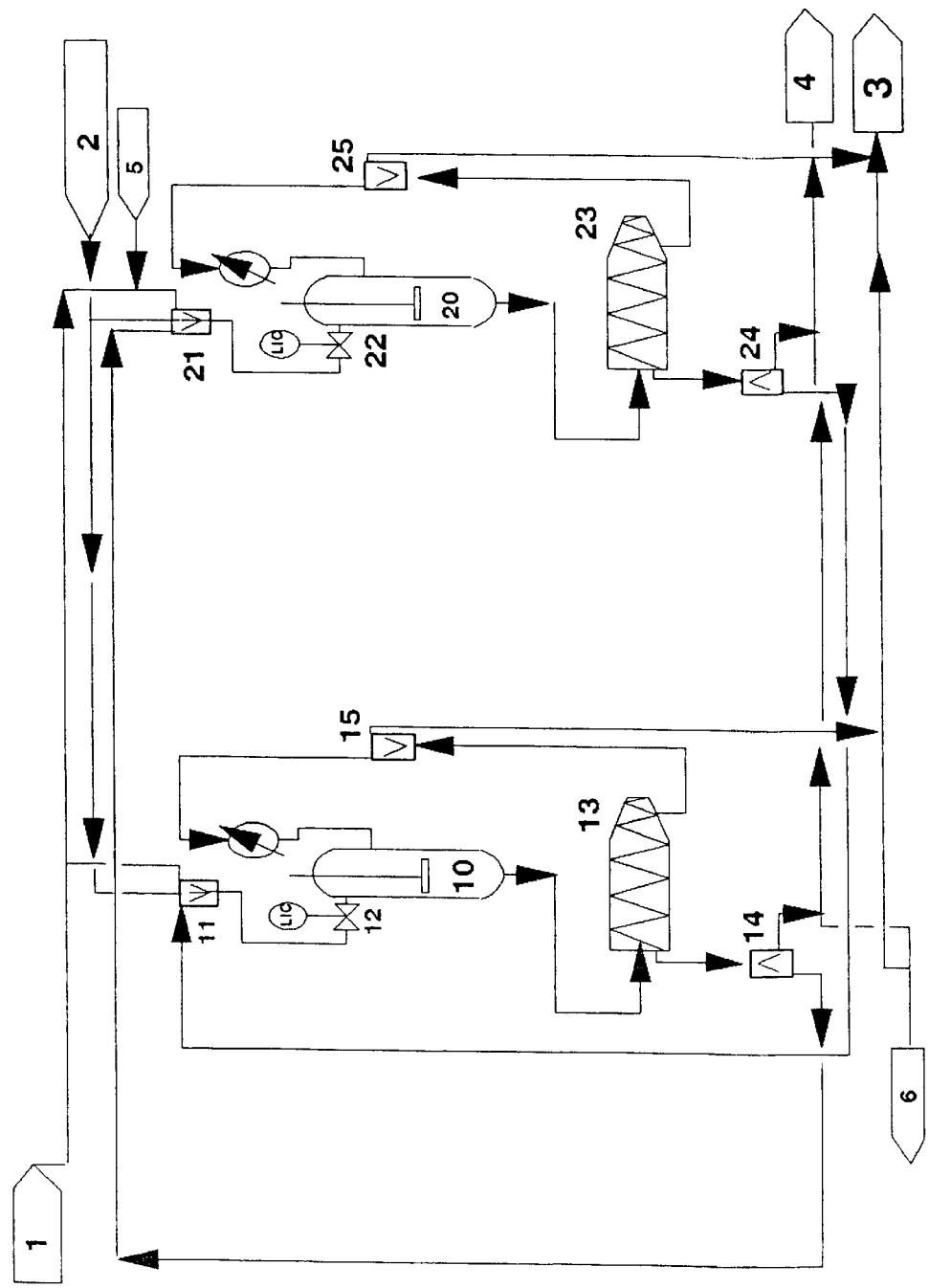
FIG. 4 shows an example of a batch/continuous extraction according to the invention, illustrated in a mixer/centrifuge arrangement.

FIG. 4 shows a design of the apparatus, Apparatus (10) and (20) are stirred vessels in which the extraction takes place. In the bottom flow from the vessels (10, 20) there are centrifuges (13, 23) which separate the heavy and light phases, which are difficult to separate.

The essential feature is how it is possible to carry out the two-stage batch/continuous countercurrent process in this standard extraction apparatus.

The extraction cycle starting situation, via position 1 and the 3-way shut-off valve (11), vessel (10) is filled with a feed which has not yet undergone an extraction treatment. Vessel (20) is filled with a feed which has already undergone one extraction treatment.

Feeding of fresh ethyl acetate is starred at position 2 and this ethyl acetate is fed continuously into vessel (20) via the three-way shut-off valve (21). In this way, vessel (20) is thus filled with a feed containing clavulanic acid, which is subjected to a second extractive treatment, in this case with pure ethyl acetate. To this end, the pure ethyl acetate is mixed in vessel (20) (dispersed in the aqueous phase). Via the bottom of the vessel, the two-phase mixture is continuously supplied to the centrifuge (23). During the extraction the heavy phase which is separated in the centrifuge (23) is returned to vessel (20) via a two-way valve (25). Via another two-way valve (24), the light phase passes to the three-way valve (11) into the feed stream of vessel (10) and is fed into vessel (10).

Vessel (10) is filled with untreated feed stream containing clavulanic acid, and this feed stream is subjected to the first extractive treatment using ethyl acetate, which contains clavulanic acid, from vessel (20), To carry out the extraction, the ethyl acetate supplied is mixed in vessel (10) (dispersed in the aqueous phase), Via the bottom of the vessel, the two-phase mixture is fed continuously to the centrifuge (13). During the extraction the heavy phase which is separated in the centrifuge (13) is returned to vessel 10 via a two-way valve (15). The fight phase is the extracted product stream of clavulanic acid in ethyl acetate and, via shut-off valve (14), it leaves the process at position 4.

When vessel (20) has undergone sufficient extraction, the extraction cycle is stopped by stopping the supply of fresh ethyl acetate and emptying vessel (20) by switching over the two-way valve (25) in the discharge of the centrifuge (23) so that the treated fermentation slurry can leave the process via position (3).

Start of next extraction cycle: vessel (20) is then filled with a feed via position (1) and the three-way valve (21). Vessel (10) is filled with a feed which has thus already undergone one extraction treatment in the preceding cycle.

Via position (2) and the three-way valve (11), the pure ethyl acetate extraction agent is added to vessel (10) in order to extract the contents of this vessel for a second time, The ethyl acetate extraction agent which leaves vessel (10) passes into vessel (20) via the correct position of the two-way valve (15) which is situated in the outlet of centrifuge (13) and via the three-way valve (21). The contents of this vessel (20) consequently undergo an extraction treatment for the first time. After sufficient extraction has taken place in vessel (10), the latter is emptied and filled with as yet untreated feed stream for the next extraction cycle, and so on.

Figure 7:
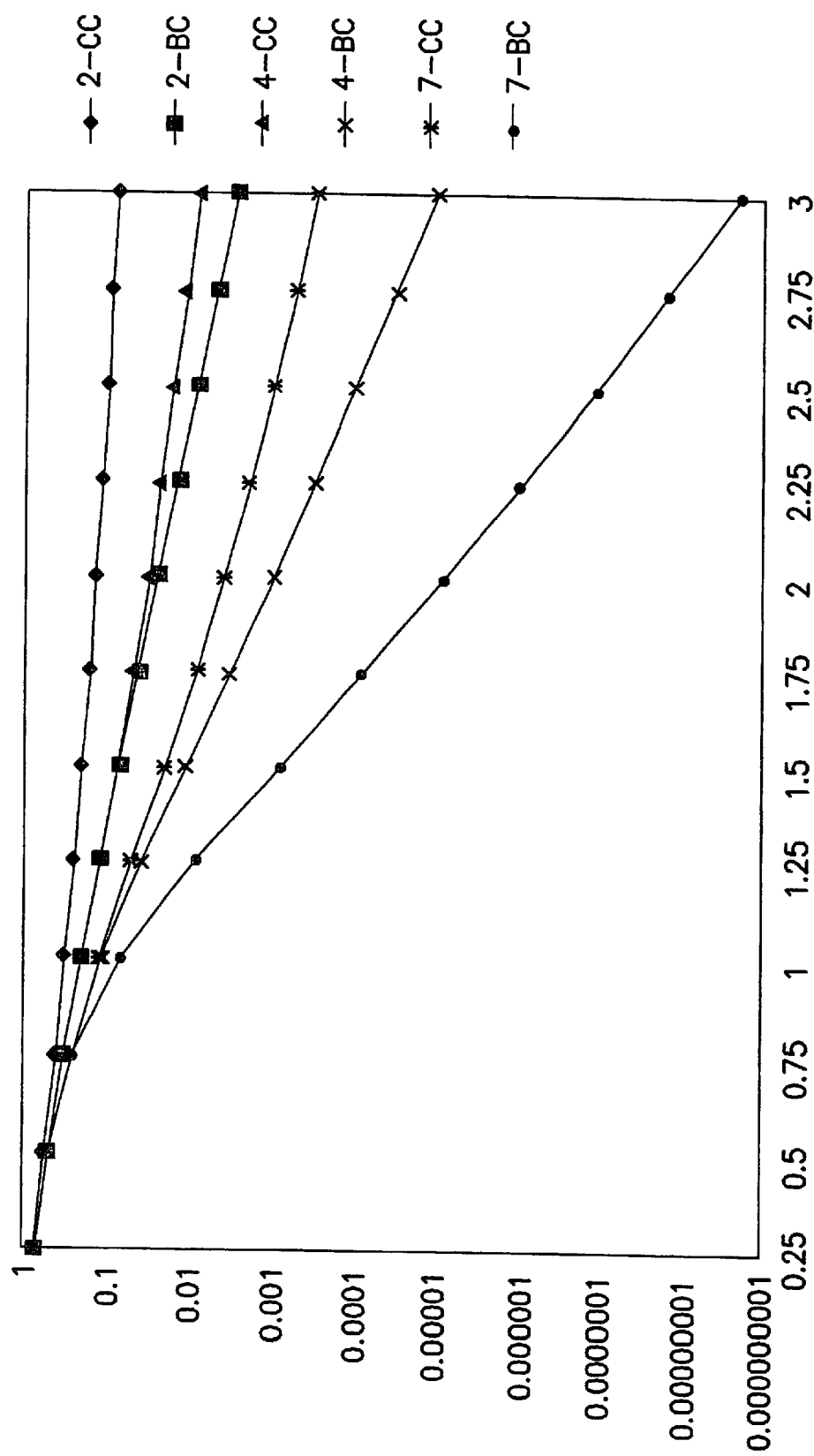
FIG. 7 shows a graph of the separation efficiency as a function of the strip factor.

This installation too provides the advantages outlined in connection with FIG. 7. Moreover. only minimal handling is required as a result of streams being switched over, Observations:

There is a cleaning-in-place feature shown in the installation illustrated in FIG. 4. Between the extraction cycles. the entire installation can be flushed clean via positions 5 and 6. This is required for clavulanic acid used in pharmaceutical applications.

If filling and emptying take up too much of the extraction cycle time in relative terms, it is possible to install a third vessel which is ready with a feed stream, so that the extraction cycle can be continued immediately and there is no effective operating time lost to filling and emptying.

If the hold-up of the extraction stream when switching over in the vessels is greater than 10% of the total stream fed through during a cycle, it is preferred, according to the invention, to divide the vessel into a plurality of mixing segments.

4. 3-stage Countercurrent Washing in a Batch/continuous Configuration.

Figure 5:
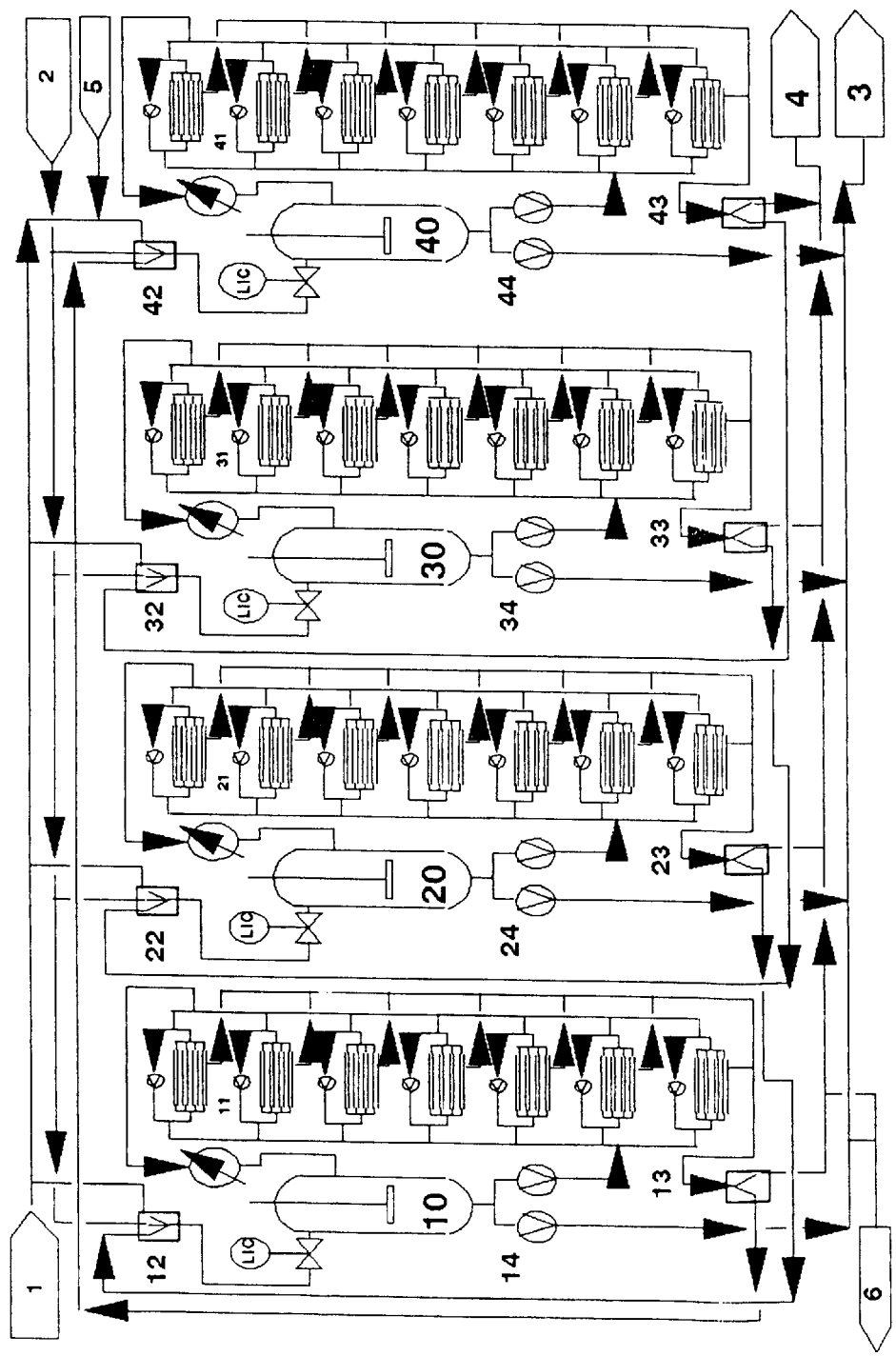
FIG. 5 shows a batch/continuous washing operation according to the invention.

This is an example of a batch/continuous washing of penicillin from fermentation slurry in an ultrafiltration unit or microfiltration unit. The concentration stage in this unit also forms a part of the example. In the example, the washing water passes continuously through the installation and the penicillin fermentation slurry passes through the installation in a batchwise manner. The installation is illustrated in FIG. 5.

Naturally, these substances serve merely as examples, and this process may also be carried out with other combinations of substances.

The installation comprises four vessels (10, 20, 30 and 40). These vessels are filled with penicillin fermentation slurry.

The feed and discharge of the membrane filtration elements (11, 21, 31, 41) are respectively connected to the bottom and a higher location of the vessels. The vessel contents, which comprise biomass, recirculate across the filtration membranes during operation. The fresh feed stream is fed, via 1 and via the three-way valve (12, 22, 32, 42), to the vessel from which the treated feed stream has just been removed (and cleaned, if appropriate). A washing operation is not carried out in this vessel; rather, the biomass is concentrated. Via the two-way shut-off valve (13, 23. 33, 43) in the correct position and via position 4, the permeate leaves the process as the product stream. The other vessels are filled with penicillin-containing fermentation slurry which has respectively been washed 0,1 and 2 times. Via the three-way shut-off valve (14, 24, 34, 44), the permeate from the vessel in which the contents undergo the third washing treatment passes to the vessel in which the contents undergo the second washing treatment, The washing water from this vessel passes to the vessel in which the contents undergo the first washing treatment. The permeate from this vessel leaves the installation, via the two-way shut-off valve (13, 23, 33, 43) in the correct position and via position 4, as the product stream. The fresh washing water is supplied via position 2. Via the three-way shut-off valve (12, 22, 32, 42), this fresh water passes into the vessel in which the contents undergo the third washing treatment.

After sufficient extraction has taken place, the following operations occur:

The stream of fresh washing water is stopped.

The streams of fresh washing water and the permeates are switched over, so that the abovementioned starting points in this example are satisfied and the new washing cycle can be started.

The vessel which has been washed three times is emptied.
After having been cleaned, if appropriate, the vessel is refilled and the feed stream is concentrated.

At the same washing water ratio (volume of washing water divided by feed stream), this three-stage batch/continuous configuration has as good a level of washing efficiency as a six-stage continuous/continuous countercurrent washing process.

The washing water ratio can be lower by a factor of 2 in order to achieve the same level of efficiency. This means that the ultrafiltration unit which separates the slurry from the permeate also only requires a membrane surface which is smaller by a factor of 2. The result is a considerable saving on investment costs as a direct result of the batch/continuous application.

Figure 6:
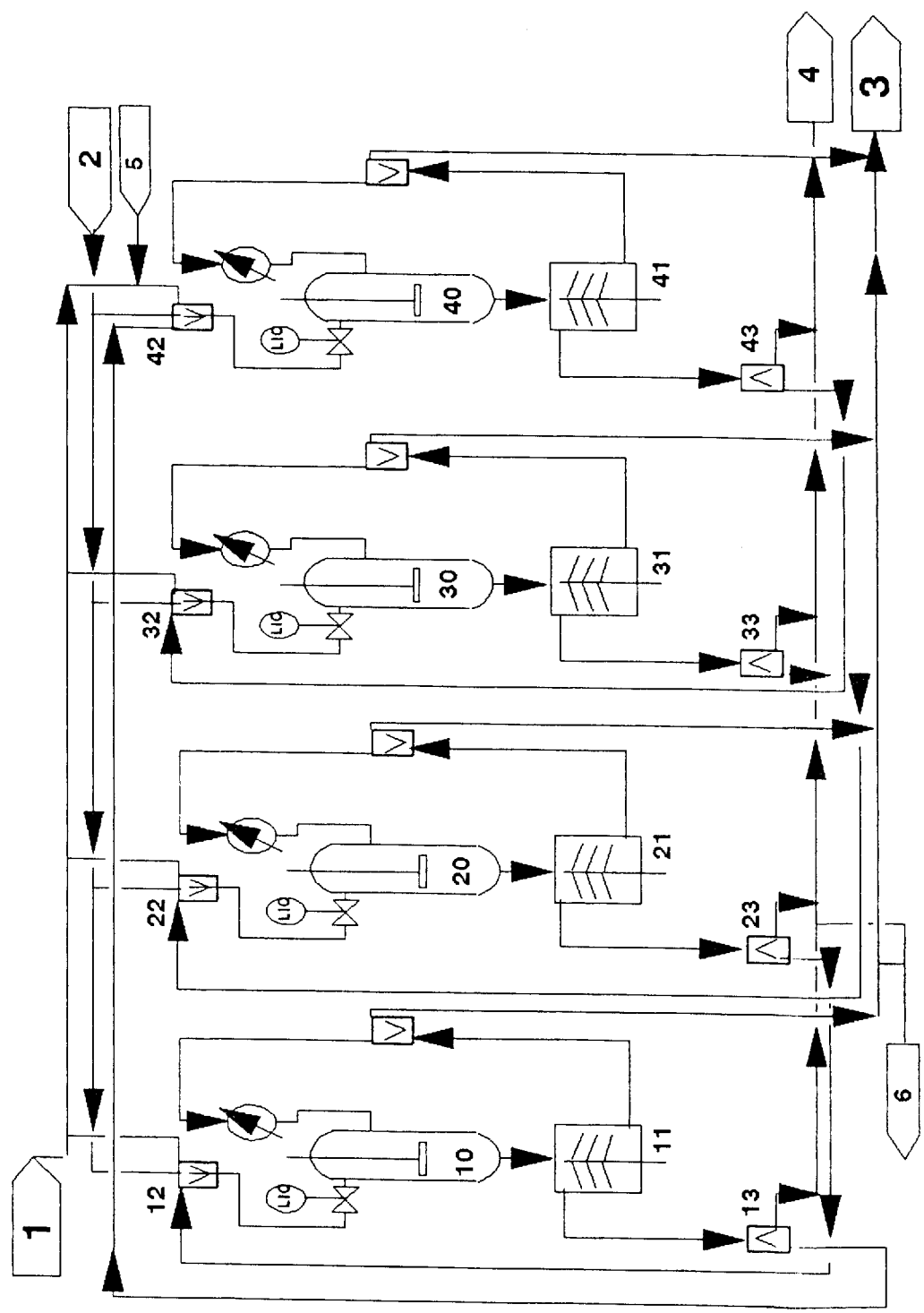
FIG. 6 shows a device in accordance with FIG. 5 in which centrifugal separation is employed.

FIG. 6 shows a centrifugal separation instead of the membrane separation beneath the vessels as in FIG. 5. Combinations of separation methods, such as the membrane separation of FIG. 5 and the centrifugal separation of FIG. 6, may in some cases be highly advantageous.

The graph illustrated in FIG. 7 shows the difference in separation efficiency between batch/continuous countercurrent (BC starting points) and The known continuous/continuous countercurrent (CC starting points), illustrated for a distillation operation. In this graph, the horizontal axis shows strip factor values.

The vertical, logarithmic axis of the graph shown in FIG. 7 depicts the fraction not removed component from the liquid phase. The graph shows how the "fraction not removed" is dependent on the strip factor, using the starting points BC and CC and the number of contact stages as parameters. The legend under the graph shows which starting points belong to which line and how many contact stages are used for The line in question. The numerals before the codes CC and BC indicate the number of contact stages used in the process.

By comparing the data in the graph shown in FIG. 7, it can be seen that the performance of the batch/continuous countercurrent process is superior to that of the continuous/continuous countercurrent process. It can be deduced from the graph that a process according to the invention makes it possible to achieve a considerable saving in power consumption in the case of distillation or in product stream volume in the case of extraction or in washing water consumption and separation capacity in washing processes.

Figure 8:
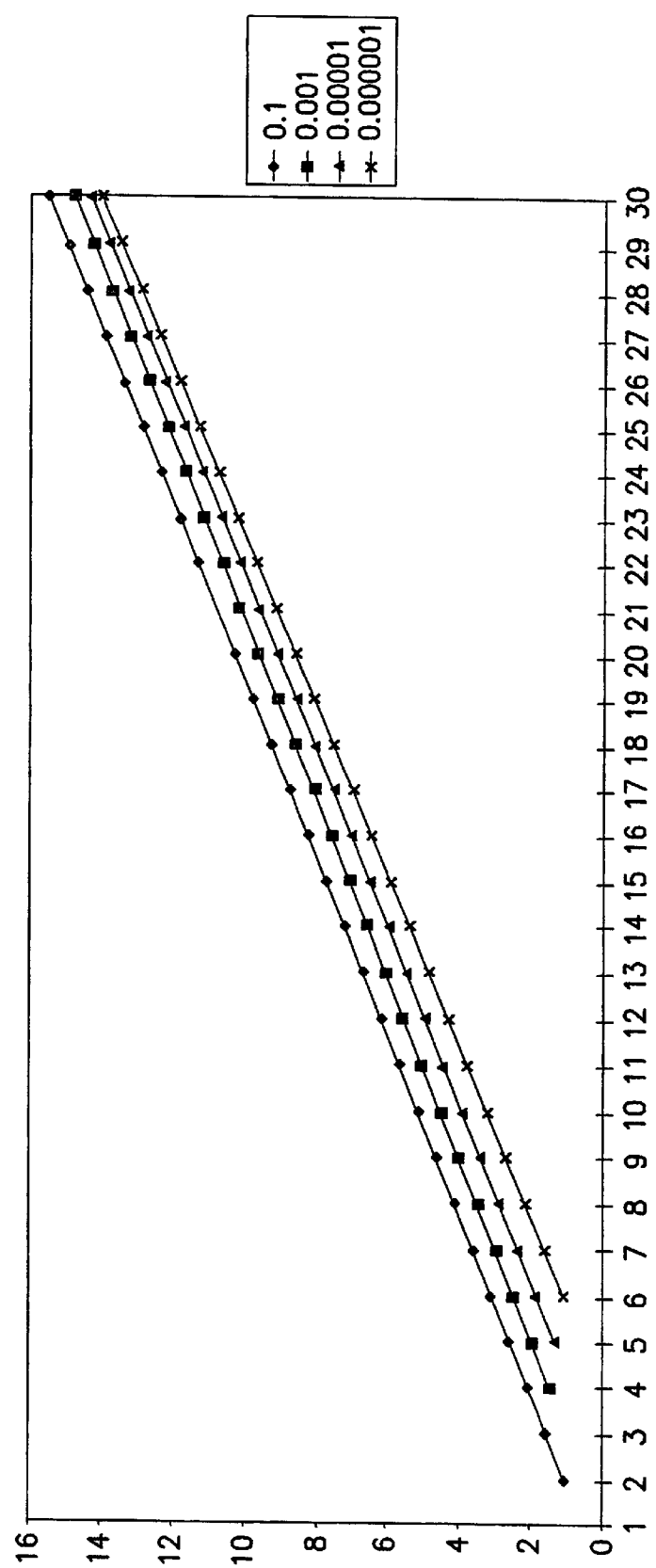
FIG. 8 shows a graph of the number of trays required according to the invention as a function of the number of conventional trays required in a stripper.

FIG. 8 describes the sane situation as FIG. 7. FIG. 8 illustrates how many conventional trays and how many trays with batch/continuous flow are required in order to obtain a bottoms specification with the same strip factor. The vertical axis shows the number of batch/continuous trays required, while the horizontal axis shows the number of conventional trays. The parameter used is the concentration ratio between bottoms and feed stream. The starting data are the same as for FIG. 7.

The conclusions from this are:

In a batch/continuous process, the number of trays required can be reduced by at least a factor of 2 by comparison with a conventional process. The column length can therefore be halved, This cuts the investment costs.

If the necessary effluent concentration is reduced, the number of trays with a batch/continuous flow can be reduced by more than a factor of 2 by comparison with conventional trays. Therefore, for very low effluent factors, The relative investment costs advantage becomes ever greater as a result of the greater relative saving on column length when using trays with batch/continuous flow instead of conventional trays.

Figure 9:
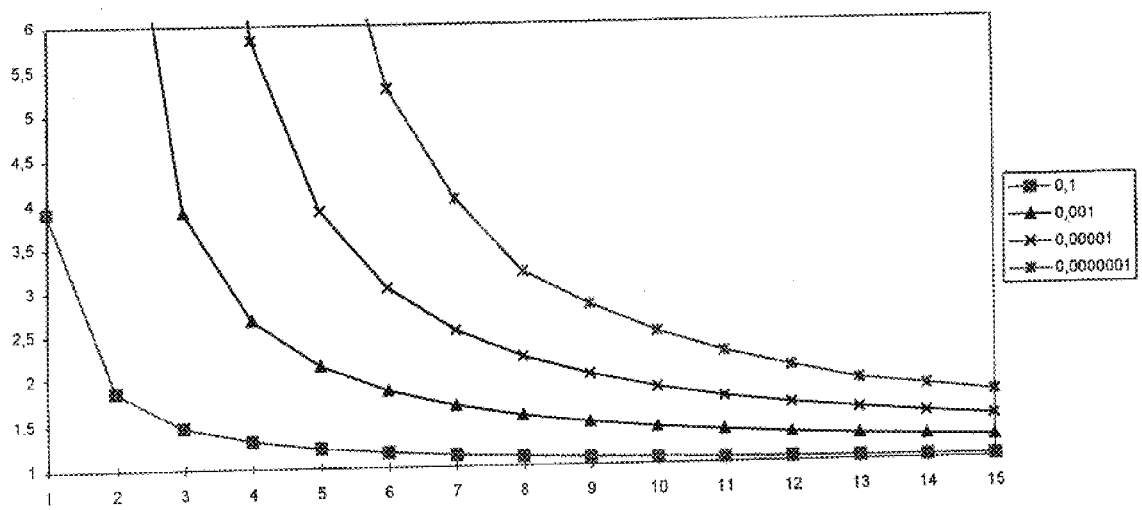
FIG. 9 shows a graph of the steam saving factor as a function of the number of trays.

FIG. 9 shows the factor by which the strip factor in batch/continuous flow processes is lower than the strip factor for the same number of conventional stripper trays in order to achieve a specific bottoms specification. This factor is called the steam saving factor, because the quantity of steam is directly proportional to the strip factor and the other factors in the strip factor do not change. The vertical axis shows the steam saving factor, while the horizontal axis shows the number of trays. The parameter used is the ratio between the concentration of bottoms and feed stream. The starting data are the same as in FIG. 7.

The Conclusions from this are;

Especially with a small number of trays and low bottoms requirements, the steam saving factor is high (approximately 400,000 for 1 tray and a bottoms/feed stream concentration ratio of $10^{-7}$).

An average factor of 2 in steam saving with trays with batch/continuous flow, in order to achieve the same specifications, indicates that the column diameter can be smaller by a factor of $\sqrt{2}$ when using trays with batch/continuous flow instead of conventional trays. In addition, the tray with batch/continuous flow does not require any downcomer area which, on average, is likely to take up 20–30% of the tray. The result is a considerable saving on investment costs for the diameter of the column when trays with batch/continuous flow are used.

Figure 10:
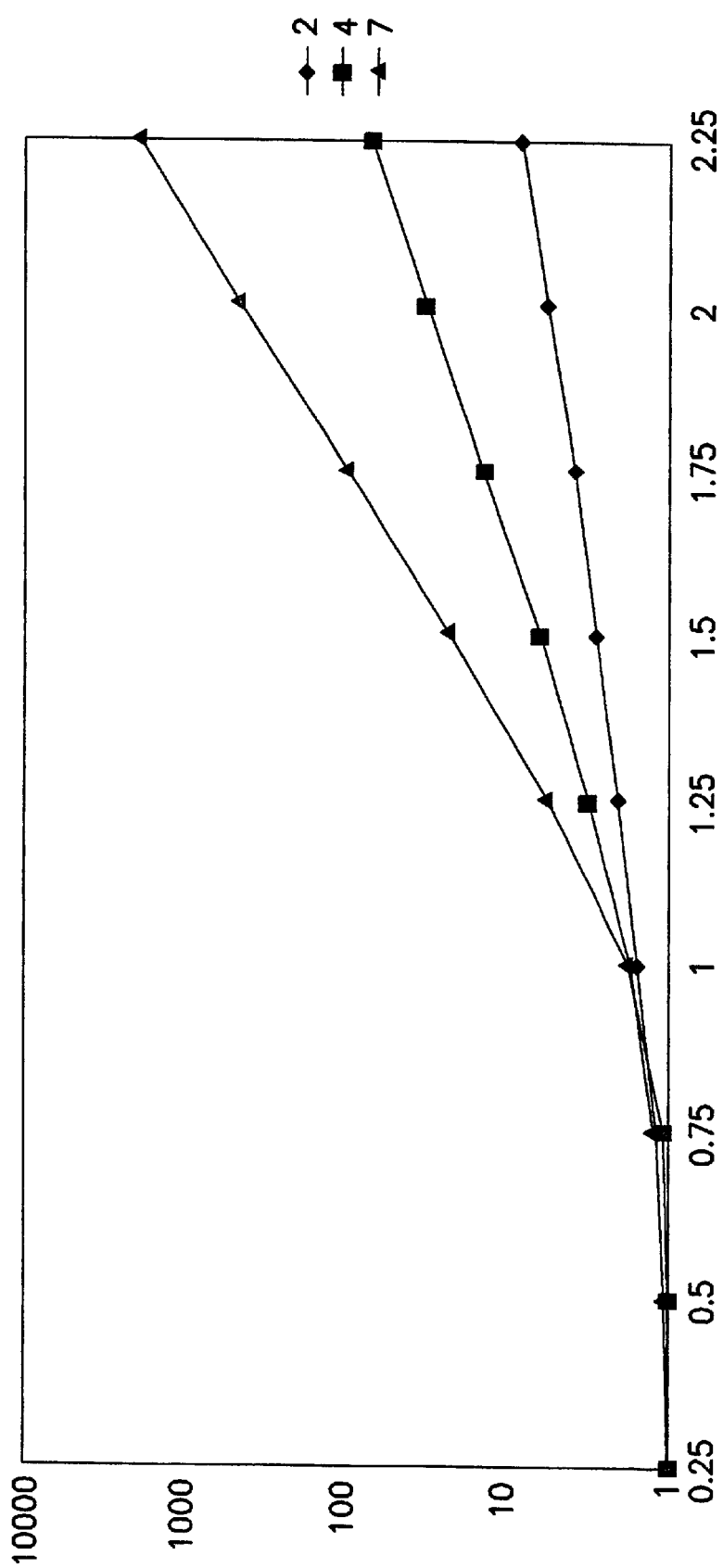
FIG. 10 shows a graph of the bottoms specification reduction factor as a function of the strip factor.

FIG. 10 indicates the bottoms specification reduction factor which it is possible to achieve with a stripper which has trays with batch/continuous flow as a function of the strip factor under the same feed stream starting conditions compared to a stripper with the same number of conventional trays. The vertical axis shows the bottoms specification reduction factor, while the horizontal axis shows the strip factor. The number of trays is taken as the parameter. The starting data are the same as for FIG. 7.

The conclusions from this are:

Under the same operating conditions and with the same number of trays, a stripper operated with trays with batch/continuous flow relatively quickly results in a bottoms specification reduction of a factor of 10 or more by comparison with a stripper filled with conventional trays.

The option of using and/or delivering purer substances allows many processes to function more optimally. Environmental strippers will be able to satisfy more stringent demands.

5. Propane/propylene Splitter (PP Splitter) in Batch/continuous Configuration.

The ethylene/ethane and propylene/propane distillation columns in cracker installations are referred to in the distillation world as superfactionators. Owing to the very minor difference in volatility, given economic reflux ratios, depending on the pressure conditions, very high columns (towers) are required to achieve the desired specifications. Everyone will have seen These high towers as, together with the stacks, they determine the skyline of a cracker. This type of giant column is also present, inter alia, in refineries and NGL plants. The highest distillation towers which are known to the inventor in a cracker installation are 90 m high. Obviously, the giant columns are extremely expensive to install and The maximum height which can be constructed economically is around 90 m. It then becomes cheaper to install a twin set of columns. The construction height which can be achieved is also a function of the length/diameter ratio of the column. This means that columns of a small diameter cannot be as high as columns with a larger diameter (given the same wall thickness).

To give a more concrete example, a PP splitter in a cracker installation comprises, when standard cooling water is used, two columns which are connected in series and each contain roughly 100–200 distillation trays in order to achieve the propylene specification with sufficient propylene recovery and a reasonable reflux ratio. If more expensive chilling water or cryogenic cooling is employed, it is possible, owing to the more favourable equilibrium stages at lower pressure, to limit the distillation to 1 column, the height of which is lowest with cryogenic cooling. Owing to the extreme reflux ratios and small difference in temperature between the components, mechanical vapour recompression is often used.

This example deals with the way in which batch/continuous PP splitters can be used to obtain considerable advantages by comparison with the conventional PP splitter technology mentioned above.

Figure 11:
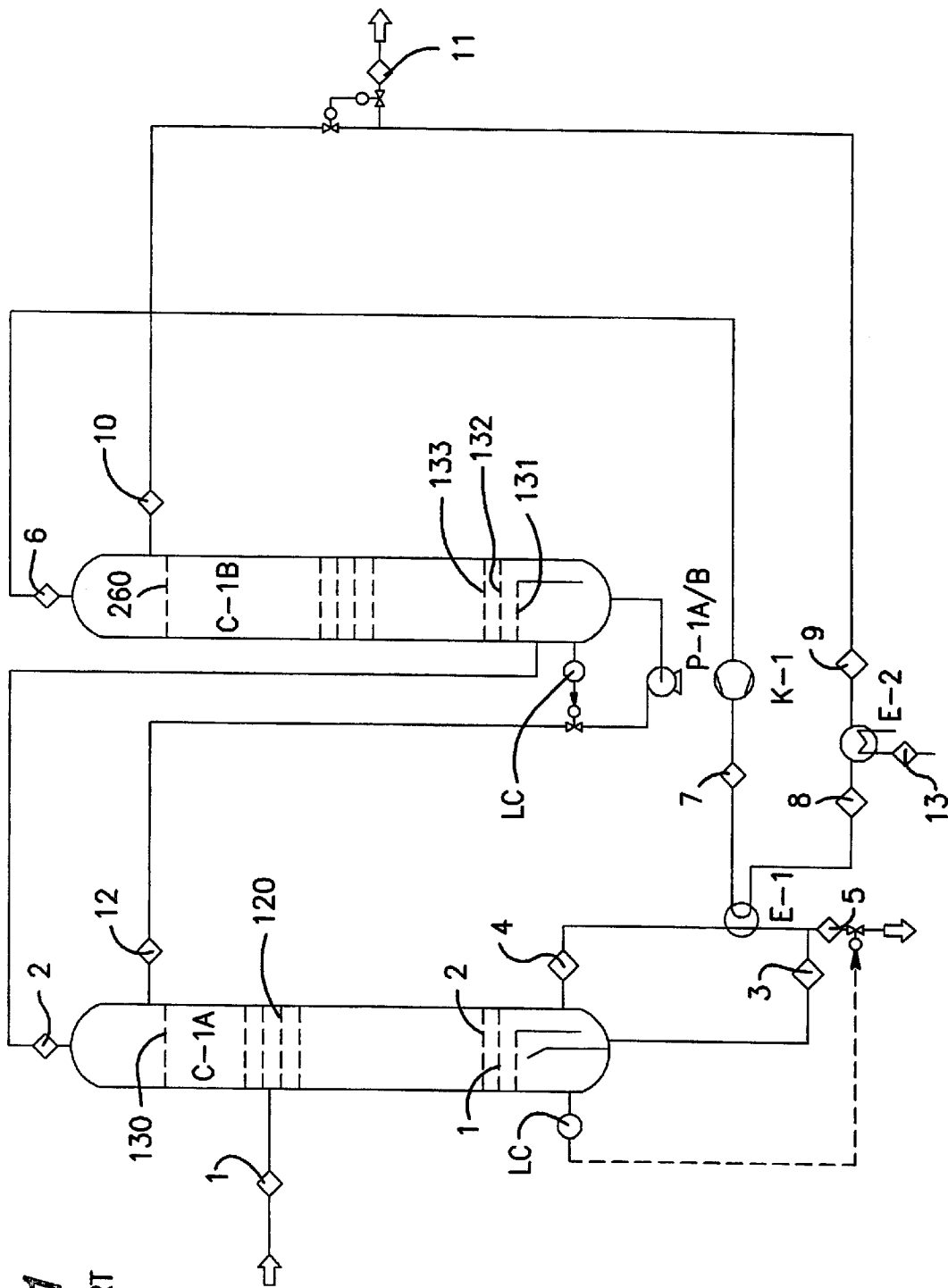
FIG. 11 shows a process flow diagram of a conventional propylene/propane splitter.

FIG. 11 shows a process flow diagram which comprises the conventional PP splitter installation. The splitter installation comprises two distillation towers, C-1A and C-1B, which are 70 m high, have an internal diameter of 4.20 meters and each contain 130 screening trays with multidowncomers.

The feed stream, stream No. 1, amounts to 1150 mtonne/day and is supplied onto the 120° tray of column C-1A. The temperature is 20° C. and the pressure 20 bar when stream 1 enters the column. The feed stream in stream 1 contains 77.4 mol % of propylene. The impurities are negligible, so that the rest of the composition may be considered to be propane.

A horizontal thermosyphon reboiler E-1 with a duty of 41 MW is positioned in the bottom of column C-1A. The supply stream of E-1 is bottom stream 3, while the discharge stream, which is a gas/liquid mixture, is stream 4. The bottom stream 12 from column C-1B is supplied to tray 130 of column C-1A via pump P-1A or B. In the design, there are two pumps connected to one outlet in case of failure of one of the pumps. However, only one pump is illustrated in the drawing. The gas stream 2 coming out of the top of column C-1A is fed into the bottom of column C-1B, beneath tray 131. The bottom stream 3 from column C-1A contains 5 mol % of propylene.

The pressure and temperature of the top gas stream 6 from column C-1B are increased in compressor K-1, so that the heat of condensation of propylene in stream 7 is able to assist with the evaporation of propane in the bottom of column C-1A via heat exchanger E-1, The temperature of the condensed stream 8 coming from heat exchanger E-1 is reduced, via cooling with cooling water supplied via stream 13 in E-2, to such an extent that this stream (stream 9) as reflux does not begin to boil at the highest point on tray 260 where his liquid is returned as reflux as stream 10. The cooling is necessary because the pressure at the highest point of the column is approx. 3 bar lower than at the floor level, owing to the considerable height of the columns The purified propylene leaves the distillation system via stream 11. The purity of the propylene is 99.5 mol %. Via stream 5, the propane stream leaves the distillation system. It contains 5 mol % of propylene. The molar reflux ratio is 12.

Figure 12:
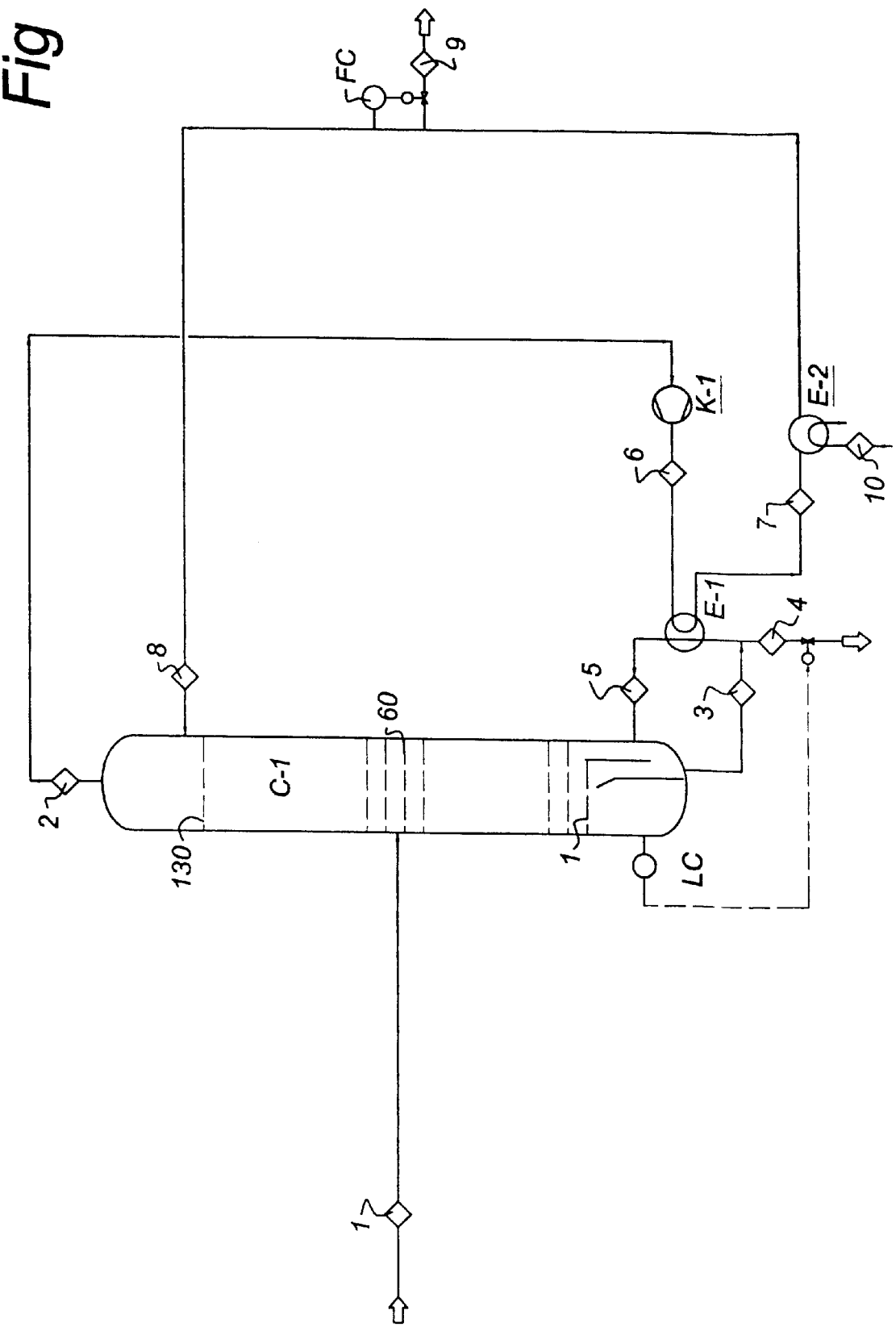
FIG. 12 shows a process flow diagram of a propylene/propane splitter according to the invention.

In the batch/continuous design of the distillation column, only one column with 130 batch/continuous trays (BC trays) is required to achieve the same level of performance as in the two conventional columns together illustrated in FIG. 11. FIG. 12 shows a process flow diagram for the batch/continuous arrangement.

The composition of Me feed stream is the same as in FIG. 11. This feed stream is supplied continuously to the 60th tray (stream 1). The temperature and pressure of the vapour stream 2 from the column are increased, via compressor K-1, to such an extent that stream 6 is sufficiently warm for it to partially evaporate the bottom stream 3 in heat exchanger E-1. The vapour/liquid mixture is returned to the column as stream 5. The condensed stream 7, which is cooled with cooling water stream 10 in E-2 to such an extent that the reflux stream 8 introduced onto tray 130 does not evaporate, emanates from heat exchanger E-1.

The propylene stream, which is 99.5% pure, leaves the process as stream 9. The propane stream discharged leaves the process, as stream 4, with a propylene content of 5 mol %.

In principle, the diameter of column C-1 may be less than 4 in, owing to the fact that no downcomers are required.

Figure 13:
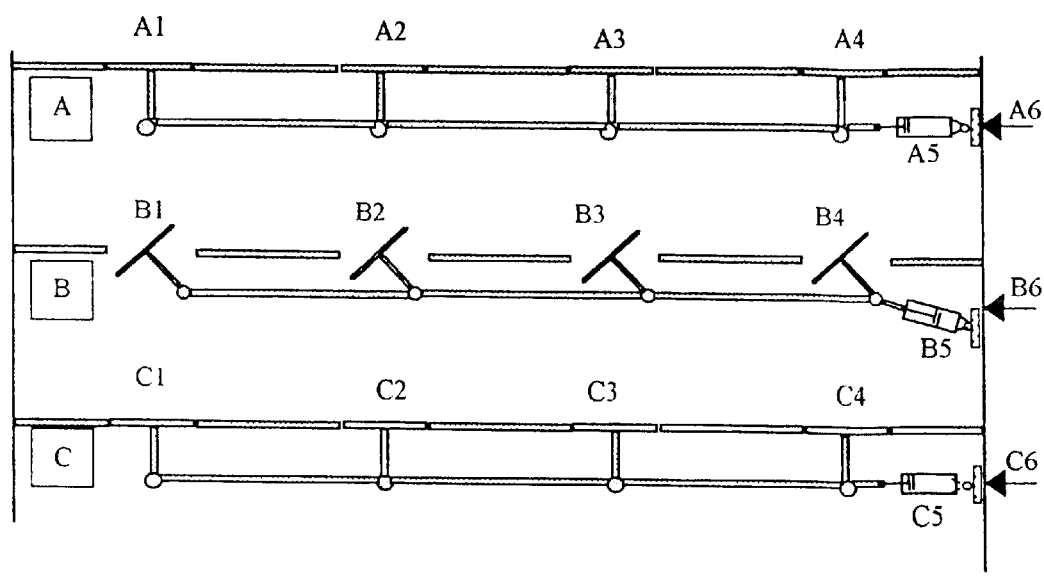
FIG. 13 shows a tray design for a device which operates in a batch-continuous manner.

The tray design, which ensures the batchwise transport of the liquid phase across the trays in column E-1, is shown in FIG. 13. In order to obtain sufficiently rapid downloading of the liquid in the tray, an opening surface area of 40% is required in the tray. The design makes this possible by allowing 4 valves in the tray floor to rotate open. The drawing in FIG. 13 shows 3 of the 130 BC trays, namely the trays A, B and C. The downcomer valves A1, A2, A3 and A4 in tray A and the downcomer valves C1, C2, C3 and C4 in tray C are closed. The downcomer valves B1, B2, B3 and B4 in tray B are open. After tray B has been emptied, the downcomer valves B1, B2, B3 and B4 open again. Immediately afterwards, the downcomer valves in tray C then open.

The moment required to open the downcomer valves is provided by pneumatic cylinders which, via a rotating joint, are attached to reinforcements on the wall of the column. The pneumatic cylinder which opens tray A is A5, the cylinder which opens tray B is B5 and the cylinder which opens tray C is C5. In the middle, the valves arc attached to a rotatable shaft in the plane of the tray. The valves are attached by means of their arms to a rotating joint which is connected to the pneumatic cylinder. The pneumatic cylinder is able to open and close the valves within a very short time. In the case of propylene/propane, the pressure in the pneumatic cylinder is provided by a 10-bar $N_2$ system. The nitrogen is supplied via a riser pipe outside the column and, via points A6, B6 and C6, is passed to the respective pneumatic cylinders A5, B5 and C5. The entire downcomer valve installation is sufficiently robust to allow a service life of a number of years. Caged valves are arranged in the floor of the trays (caged valves are also arranged on the downcomer valves), in order to allow the gas to pass through. Valve trays with a very low level of weeping are selected.

Figure 14:
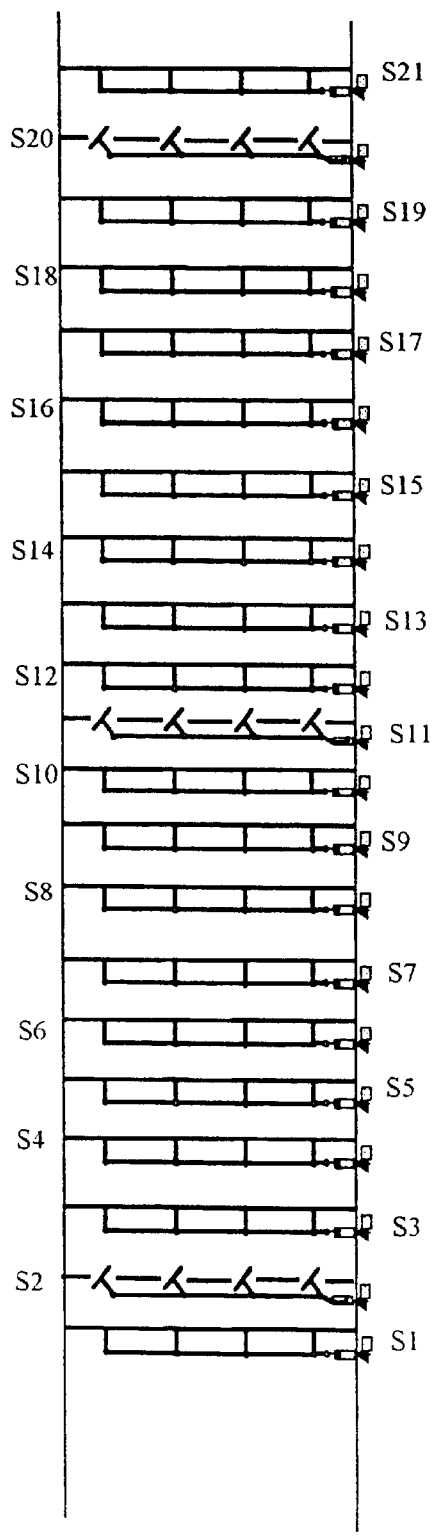
FIG. 14 shows part of a propylene/propane distillation column which is of batch-continuous design.

The liquid load on the trays is sufficiently great for it to be possible to empty a plurality of trays simultaneously in the batch/continuous design. This is illustrated diagrammatically in FIG. 14 by showing a section of the batch/continuous propene/propane column with 130 trays. This figure shows 21 of the 130 trays. In this instance, the downcomer valves of the trays S2, S11 and S20 are open. Therefore, in order to drain sufficient liquid in this design, every 9th tray throughout the entire column is to be emptied. The number of trays between the highest and lowest emptying trays should also be 9.

The feed stream is supplied "continuously" via stream 1 in the flow diagram shown in FIG. 11. This is possible because the reflux ratio of the column is high and the volume of the BC tray increases by less than 10% as a result of the continuous feed stream during a cycle between emptying.

The reflux is also supplied "continuously" to the top BC tray, This means that this top BC tray does not have a constant volume; rather, it is full only at the end of the cycle, just before being emptied. The advantage of conventional continuous supply makes up for the lower efficiency of the top tray.

The volume in the thermosyphon reboiler bottom is to be constant. This is achieved by providing the lowest BC tray just above the bottom with a regulating function. The lowest tray is regulated in such a manner that the discontinuous liquid stream from tray 2 flows towards the bottom as a constant liquid stream. The level at the lowest tray can therefore change. The advantages of using a thermosyphon reboiler and of having a continuous bottom drain compensate for a slightly lower efficiency of the bottom tray.

Very small variations in concentration occur in the top stream and bottom stream, which meet the desired specification.

Conclusions from comparing the PP splitter using the conventional steady-state continuous/continuous countercurrent and batch/continuous countercurrent operations:

One pressure column, with a height of 70 m and a diameter of 4.2 m, can be dispensed with.

2 large pumps 2 A/B, each with a capacity of 460 $m^3/h$, can be dispensed with.

The distillation column which remains can have a diameter of less than 4 m.

In addition to the basic saving on apparatus, there is an even greater saving on set-up equipment.

The batch/continuous countercurrent column can be operated with identical heat exchange networks, mechanical vapour recompression and other peripherals, as has been customary to date in the conventional non-steady-state continuous/continuous techniques.

The specification of the tops with respect to the purity of the propylene and the level of recovery of propylene can easily be increased significantly by a little extra reflux in, for example, the same column diameter as that of the conventional method or by means of a number of additional trays.

The batch/continuous method therefore has good debottlenecking potential to eliminate bottlenecking in columns in accordance with the conventional design.

A higher level of propylene purity means less drainage and possibly a better efficiency in downstream installations and factories.

Although the tray design is more expensive, these costs are nothing compared to the savings.

Pneumatic cylinders with a very high level of reliability are available for this design.

7. Tray Design for Absorption Treatments with a High Generation of Heat and Other Non-adiabatic Mass Transfer Operations.

Figure 15:
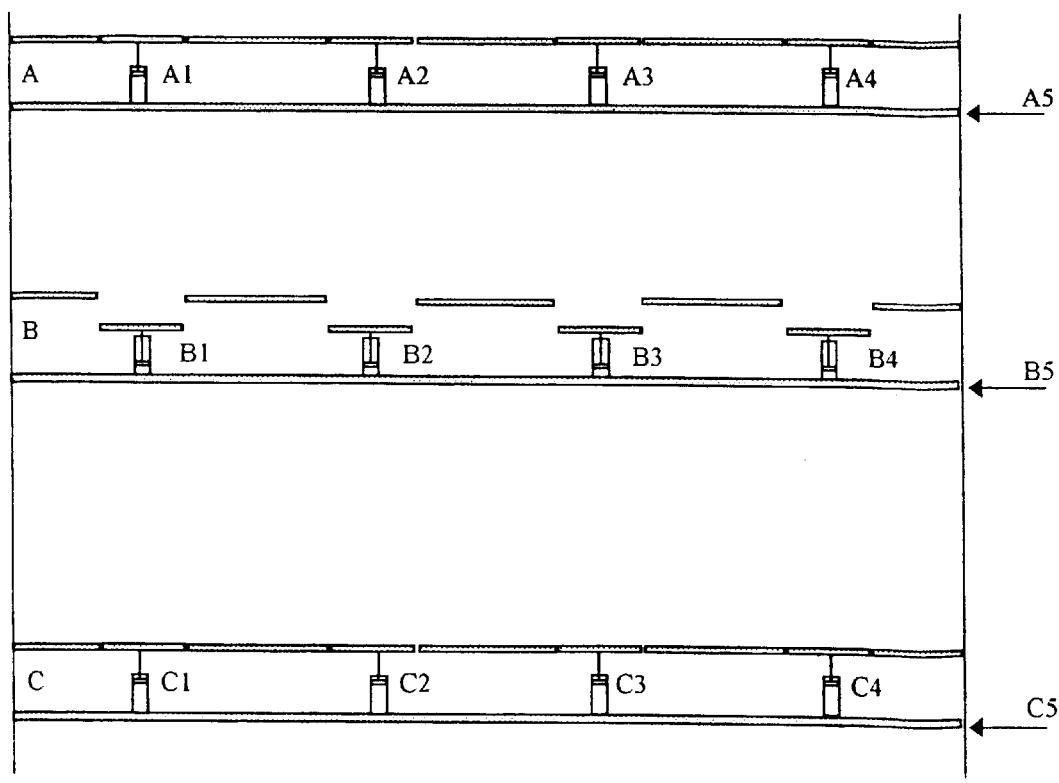
FIG. 15 shows a design of tray for batch/continuous mass transfer operations which require a high level of heat exchange.

FIG. 15 shows a tray design which is eminently suitable for optimizing mass transfer operations which require high levels of heat exchange.

The batch/continuous tray is suitable for high heat transfer duties on the tray, particularly because the liquid level on the tray is normally (and is allowed to be) much higher than on conventional trays. This means that a much larger heating or cooling coil surface area can be efficiently installed on one tray than that which can be installed on a conventional tray, even if this conventional tray is provided with high weirs. This is because in a conventional tray the liquid also has to flow through the coils from downcomer outlet to downcomer feed.

FIG. 15 shows 3 BC trays, namely trays A, B and C. There are 4 downcomer valves in the trays. These are numbered A1 to A4, B1 to B4 and C1 to C4 for trays A, B and C, respectively. The characteristic feature of the trays is that the pneumatic cylinder (selected in this case, but other drive principles are also possible) is positioned below the respective valves and that the movement for opening and closing the valve takes place in the vertical direction. Any nitrogen, air or other gas required when the valves are opened pneumatically can be supplied via the pipes and/or bars which support the cylinders, respectively via A5, B5 and C5.

The characteristic feature of the valve is that it now opens downwards. As a result, the area on the valve can be exploited to its maximum extent for the positioning of heat exchange coils.

8. Tray Design for Lower Pressures.

A tray design in accordance with FIG. 15 is suitable for reducing pressure fluctuations, which may be important at low distillation pressures. However, in this case, the number of downcomer valves is increased considerably and may rise to the same order of magnitude as the number of valves and bubble caps which are normally situated on a distillation plate. The downcomer valves may also in this case open upwards. Opening a plurality of valves by means of 1 pneumatic cylinder, another drive mechanism, minimization of the opening forces and maximization of the opening surface area are, of course, optimization measures allowing the tray to be discharged quickly.

What is claimed is:

1. Mass transfer process, in which, in at least two contact stages, at least two liquid or gaseous phases are brought into contact with one another, at least one component being transferred between the phases and the phases moving countercurrently, wherein the flow through at least one of the at least two contact stages is batchwise for one phase and continuous for another phase and wherein the phases flow through contact stages which are formed by trays in a column, which trays are opened periodically so that the phase which flows through the column in a batchwise manner flows to the next tray.

2. Mass transfer process according to claim 1, which is a distillation process.

3. Mass transfer process according to claim 2, which is a distillation process for mixtures with a narrow boiling range.

4. Mass transfer process according to claim 3, which is a propylene/propane or ethylene/ethane distillation process.

5. Mass transfer process according to claim 1, which is an extraction process.

6. Mass transfer process according to claim 1, in which one of the phases is a liquid and another phase is a liquid which contains a dispersed solid, which phases transfer mass in the contact stage by mixing, and in which process, after the mass transfer, in each contact stage a liquid-containing solid phase is separated from a liquid phase which does not contain any solid material.

7. Mass transfer process according to claim 6, which is a washing process.

8. Mass transfer process according to claims 6, which is an extraction process.

9. Mass transfer process according to claim 6, in which each contact stage is coupled to a unit operation which is separate or integrated with the contact stage and in which the two phases are separated.

10. Mass transfer process according to claim 9, in which the unit operation in which the two phases are separated from one another is a gravity settler, a centrifuge or a filtration device.

11. Mass transfer process, in which, in at least two contact stages, and at least two liquid or gaseous phases are brought into contact with one another, at least one component being transferred between the phases and the phases moving countercurrently, wherein the flow through at least one of the contact stages is batchwise for one phase and continuous for another phase and wherein the phases flow through contact stages which are formed by separate vessels which are coupled to one another such that, by diverting the phase which passes through the at least two contact stages continuously, the batchwise phase can remain in the same vessel throughout the entire process.

12. Mass transfer process according to claim 1, which is a distillation process.

13. Mass transfer process according to claim 12, which is a distillation process for mixtures with a narrow boiling range.

14. Mass transfer process according to claim 13, which is a propylene/propane or ethylene/ethane distillation process.

15. Mass transfer process according to claim 11, in which one of the phases is a liquid and another phase is a liquid which contains a dispersed solid, which phases transfer mass in the contact stage by mixing, and in which process, after the mass transfer, in each contact stage a liquid-containing solid phase is separated from a liquid phase which does not contain any solid material.

16. Mass transfer process according to claim 11, in which one of the phases is a liquid and another phase is a liquid which contains a dispersed solid, which phases transfer mass in the contact stage by mixing, and in which process, after the mass transfer, in each contact stage a liquid-containing solid phase is separated from a liquid phase which does not contain any solid material.

17. Mass transfer process according to claim 16, which is a washing process.

18. Mass transfer process according to claim 16, which is an extraction process.

19. Mass transfer process according to claim 16, in which each contact stage is coupled to a unit operation which is separate or integrated with the contact stage and in which the two phases are separated.

20. Mass transfer process according to claim 19, in which the unit operation in which the two phases are separated from one another is a gravity settler, a centrifuge or a filtration device.

21. Mass transfer process, in which, in at least two contact stages, and at least two liquid or gaseous phases are brought into contact with one another, at least one component being transferred between the phases and the phases moving countercurrently, in which the flow through at least one of the contact stages is batchwise for two phases.

22. Mass transfer process according to claim 21, in which a flow through at least two of the contact stages is batchwise for two phases.

23. Mass transfer process according to claim 21, in which each contact stage is coupled to a separate unit operation in which the two phases are separated.

24. Mass transfer process, in which, in at least two contact stages, and at least two liquid or gaseous phases are brought into contact with one another, at least one component being transferred between the phases and the phases moving countercurrently, wherein the flow through at least one of the at least two contact stages is batchwise for one phase and continuous for another phase, with the proviso that at least one of the phases is a gaseous phase.

25. Mass transfer process according to claim 24, in which the flow through at least two of the contact stages is batchwise for one phase and continuous for another phase.

26. Device for mass transfer, comprising a reservoir with a top and a bottom;

a feed (1) in the top and a discharge (4) in the bottom, for feeding and discharging a phase;

a feed (2) in the bottom and a discharge (3) in the top, for feeding and discharging another phase;

at least two contact stages (S) in which one phase is brought into contact with another phase;

the at least two contact stages being such that one phase flows through the contact stage in a batchwise manner and the other phase flows through the contact stage continuously and the at least two contact stages being trays which can be emptied periodically so that the phase which is flowing in a batchwise manner is able to move to the next contact stage.

27. Device according to claim 26, in which the trays rotate along a horizontal axis, and in which, when the tray is lying in the horizontal plane, the tray fits into the column, and, when the tray is rotated out of the horizontal plane, the desired phase can be periodically conveyed to the next tray.

28. Device according to claim 26, in which a tray which can move in the vertical direction is mounted between each pair of successive fixed column trays, which movable tray floats on the heavy phase and sinks into the light phase and, during the periodic batchwise emptying of the fixed trays, is impermeable to the phase which is conveyed in a batchwise manner and, during normal operation, is permeable to the phase which is conveyed in a batchwise manner.

29. Device according to claim 26, in which the trays are provided with rotatable valves which can be opened with the aid of pneumatic cylinders.

30. Device according to claim 26, in which the trays are provided with downcomer valves which can be opened in the downward direction with the aid of pneumatic cylinders.

31. Device for mass transfer, comprising a reservoir with a top and a bottom;

a feed (1) in the top and a discharge (4) in the bottom, for feeding and discharging a phase;

a feed (2) in the bottom and a discharge (3) in the top, for feeding and discharging another phase;

at least two contact stages (S) in which one phase is brought into contact with another phase;

the at least two contact stages being such that one phase flows through the contact stage in a batchwise manner and the other phase flows through the contact stage continuously and the at least two contact stages having bubble caps or valves.

* * * * *